US007902815B2

(12) United States Patent
Woodard et al.

(10) Patent No.: US 7,902,815 B2
(45) Date of Patent: *Mar. 8, 2011

(54) WIRELESS SYSTEM AND METHOD FOR COLLECTING MOTION AND NON-MOTION RELATED DATA OF A ROTATING SYSTEM

(75) Inventors: Stanley E. Woodard, Hampton, VA (US); Bryant D. Taylor, Smithfield, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 640 days.

This patent is subject to a terminal disclaimer.

(21) Appl. No.: 11/856,807

(22) Filed: Sep. 18, 2007

(65) Prior Publication Data
US 2009/0072814 A1     Mar. 19, 2009

(51) Int. Cl.
*G01P 3/44* (2006.01)
(52) U.S. Cl. .................................................. 324/173
(58) Field of Classification Search .................. None
See application file for complete search history.

(56) References Cited

U.S. PATENT DOCUMENTS

| | | | | |
|---|---|---|---|---|
| 5,008,647 A | * | 4/1991 | Brunt et al. | 340/432 |
| 5,291,180 A | * | 3/1994 | Reeb | 340/572.5 |
| 5,459,397 A | * | 10/1995 | Spillman, Jr. | 324/160 |
| 5,608,417 A | * | 3/1997 | de Vall | 343/895 |
| 6,593,730 B2 | * | 7/2003 | Zapf | 324/207.17 |
| 6,662,642 B2 | | 12/2003 | Breed et al. | |
| 6,738,697 B2 | | 5/2004 | Breed | |
| 6,741,169 B2 | | 5/2004 | Magiawala et al. | |
| 6,758,089 B2 | | 7/2004 | Breed et al. | |
| 6,850,824 B2 | | 2/2005 | Breed | |
| 6,988,026 B2 | | 1/2006 | Breed et al. | |
| 7,034,672 B2 | | 4/2006 | Dinello et al. | |
| 7,050,017 B2 | | 5/2006 | King et al. | |
| 7,082,359 B2 | | 7/2006 | Breed et al. | |
| 7,086,593 B2 | | 8/2006 | Woodard et al. | |
| 7,089,099 B2 | | 8/2006 | Shostak et al. | |
| 7,103,460 B1 | | 9/2006 | Breed | |
| 7,159,774 B2 | | 1/2007 | Woodard et al. | |
| 7,161,476 B2 | | 1/2007 | Hardman et al. | |
| 7,255,004 B2 | | 8/2007 | Taylor et al. | |
| 2007/0132449 A1 | * | 6/2007 | Madni et al. | 324/207.25 |
| 2007/0157718 A1 | | 7/2007 | Woodard et al. | |
| 2007/0181683 A1 | | 8/2007 | Woodard et al. | |
| 7,583,090 B2 | * | 9/2009 | Pchelnikov et al. | 324/635 |
| 2004/0066296 A1 | * | 4/2004 | Atherton | 340/572.1 |
| 2005/0007239 A1 | * | 1/2005 | Woodard et al. | 340/10.2 |
| 2006/0243043 A1 | | 11/2006 | Breed | |

OTHER PUBLICATIONS

Stanley E. Woodard et al., "Magnetic Field Response Measurement Acquisition System," NASA TM 2005-213518, NASA, (Feb. 1, 2005).
Stanley E. Woodard and Bryant D. Taylor, "Measurement of Multiple Unrelated Physical Quantities Using a Single Magnetic Field Response Sensor," Measurement Science and Technology (UK), (vol. 18), (Issue. 200), (pp. 1603-1613).

* cited by examiner

*Primary Examiner* — Jay M Patidar
(74) *Attorney, Agent, or Firm* — Robin W. Edwards (57) ABSTRACT

A wireless system for collecting data indicative of a tire's characteristics uses at least one open-circuit electrical conductor in a tire. The conductor is shaped such that it can store electrical and magnetic energy. In the presence of a time-varying magnetic field, the conductor resonates to generate a harmonic response having a frequency, amplitude and bandwidth. A magnetic field response recorder is used to (i) wirelessly transmit the time-varying magnetic field to the conductor, and (ii) wirelessly detect the harmonic response and the frequency, amplitude and bandwidth, associated therewith. The recorder is adapted to be positioned in a location that is fixed with respect to the tire as the tire rotates.

25 Claims, 8 Drawing Sheets

WIRELESS SYSTEM AND METHOD FOR COLLECTING MOTION AND NON-MOTION RELATED DATA OF A ROTATING SYSTEM

ORIGIN OF THE INVENTION

The invention was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to wireless sensing systems. More specifically, the invention is a wireless system for collecting data that can be used to determine multiple characteristics associated with a non-conductive rotating system such as tires, pulleys, propellers, etc. Collected data can be used to determine, for example, rotational speed, temperature of the rotating system, rotational direction, and conditions during manufacturing and/or rotational operation.

2. Description of the Related Art

Most vehicles use some type of inflated tire as the point-of-contact between the vehicle and a ground/road surface. The integrity of a vehicle's tires is critical to vehicle safety. Accordingly, a variety of sensor systems (e.g., surface acoustic wave transducers, radio frequency identification-based sensors, etc.) has been developed that provide for the monitoring of various tire parameters of interest. However, each of these systems requires a dedicated sensor for each type of parameter to be measured. This increases the complexity and cost of a tire health monitoring system.

SUMMARY OF THE INVENTION

Accordingly, it is an object of the present invention to provide a method and system for collecting data of rotating systems such as tires, pulleys and propellers.

Another object of the present invention is to provide a method and system for collecting tire data in a wireless fashion.

Still another object of the present invention is to provide a system and method for collecting a variety of types of tire data using a single sensor.

Yet another object of the present invention is to provide a system and method for collecting a variety of types of tire data using a single sensor that is a single component.

Other objects and advantages of the present invention will become more obvious hereinafter in the specification and drawings.

In accordance with the present invention, a wireless system for collecting data indicative of a tire's characteristics uses at least one electrical conductor having first and second ends and shaped to form a geometric pattern therebetween. The conductor so-shaped defines an open-circuit having no electrical connections that can store energy in a magnetic field and an electric field and transfer the energy between both fields. In the presence of a time-varying magnetic field, the conductor so-shaped resonates to generate a harmonic response having a frequency, amplitude and bandwidth. The conductor so-shaped is adapted to be positioned within a tire. A magnetic field response recorder is used to (i) wirelessly transmit the time-varying magnetic field to the conductor, and (ii) wirelessly detect the harmonic magnetic field response frequency, amplitude and bandwidth associated therewith. The recorder is adapted to be positioned in a location that is fixed with respect to the tire as the tire rotates.

DETAILED DESCRIPTION OF THE INVENTION

Figure 1:
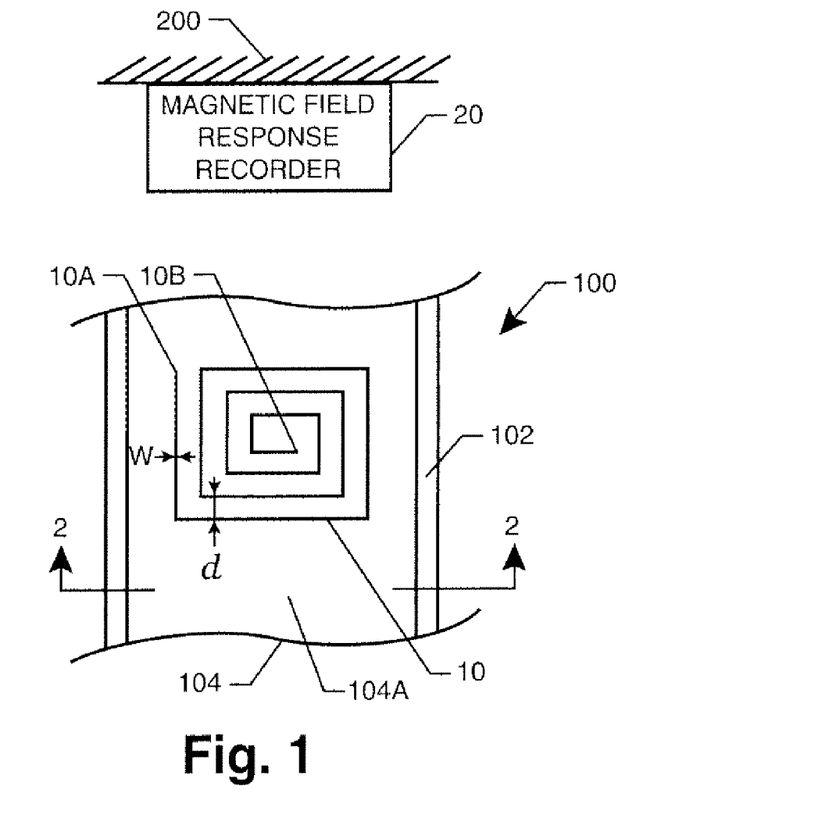
FIG. 1 is a plan view of a portion of a tire's interior having a sensor mounted therein and a schematic view of a magnetic field response recorder for powering/reading the sensor in accordance with the present invention.
Figure 2:
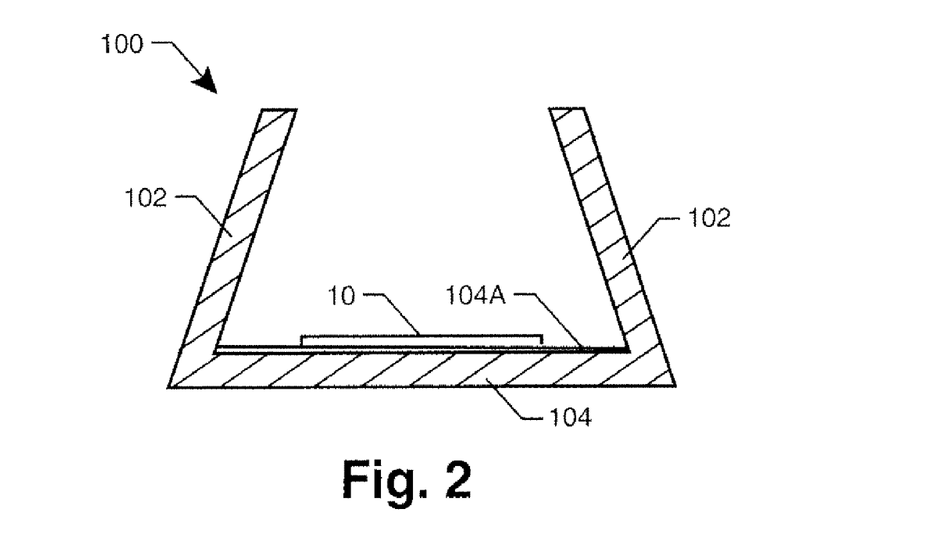
FIG. 2 is a cross-sectional view of the tire taken along line 2-2 in FIG. 1.

Referring now to the drawings and more particularly to FIGS. 1 and 2, a wireless system for collecting tire data in accordance with an embodiment of the present invention is shown. In FIG. 1, a portion of a tire 100 is illustrated as it would appear if viewed from the center thereof while FIG. 2 is a cross-sectional view of tire 100 taken along line 2-2 in FIG. 1. Tire 100 has side walls 102 and a tread wall 104 that combine to define a generally U-shape cross-section as would be well understood in the art. The interior surface of tread wall 104 is referenced by numeral 104A. In general, tire 100 is made from a rubber-based material and can have cords and/or metal belts (not shown) embedded therein as is well known in the art of tire construction. It is to be understood that the particular construction of tire 100 is not a limitation of the present invention.

In the illustrated embodiment, a wireless system for collecting tire data uses an open-circuit spiral trace sensor 10 and a magnetic field response recorder 20. Although a spiral trace is shown, the sensor can be any open-circuit geometric pattern having no electrical connections that can store energy In a magnetic field and an electric field and transfer the energy between both fields. Sensor 10 is attached to interior surface 104A of tread wall 104 so that sensor 10 is protected from elements outside of tire 100. Details of sensor 10 are described in co-pending U.S. patent application Ser. No. 11/671,089, filed Feb. 5, 2007, the contents of which are hereby incorporated by reference and will be repeated herein to provide a complete description of the present invention.

Spiral trace sensor 10 is made from an electrically-conductive run or trace that can be deposited directly onto interior surface 104A. Sensor 10 could also be deposited onto a substrate material (not shown) that is electrically non-conductive and can be sufficiently elastically flexible to facilitate mounting to the curved interior surface 104A. The particular choice of the substrate material will vary depending on how it is to be attached to interior surface 104A. In either case, sensor 10 is a spiral winding of conductive material with its ends 10A and 10B remaining open or unconnected. Accordingly, sensor 10 is said to be an open-circuit. Techniques used to deposit sensor 10 either directly onto interior surface 104A or on a substrate material can be any conventional metal-conductor deposition process to include thin-film fabrication techniques. In the illustrated embodiment, sensor 10 is constructed to have a uniform trace width throughout (i.e., trace width W is constant) with uniform spacing (i.e., spacing d is constant) between adjacent portions of the spiral trace. However, as will be explained further below, the present invention is not limited to a uniform width conductor spirally wound with uniform spacing.

As is well known and accepted in the art, a spiral inductor is ideally constructed/configured to minimize parasitic capacitance so as not to influence other electrical components that will be electrically coupled thereto. This is typically achieved by increasing the spacing between adjacent conductive portions or runs of the conductive spiral trace. However, in the present invention, sensor 10 is constructed/configured to have a relatively large parasitic capacitance. The capacitance of sensor 10 is operatively coupled with the sensor's inductance such that magnetic and electrical energy can be stored and exchanged by the sensor. Since other geometric patterns of a conductor could also provide such a magnetic/electrical energy storage and exchange, it is to be understood that the present invention could be realized using any such geometrically-patterned conductor and is not limited to a spiral-shaped sensor.

The amount of inductance along any portion of a conductive run of sensor 10 is directly related to the length thereof and inversely related to the width thereof. The amount of capacitance between portions of adjacent conductive runs of sensor 10 is directly related to the length by which the runs overlap each other and is inversely related to the spacing between the adjacent conductive runs. The amount of resistance along any portion of a conductive run of sensor 10 is directly related to the length and inversely related to the width of the portion. Total capacitance, total inductance and total resistance for spiral trace sensor 10 is determined simply by adding these values from the individual portions of sensor 10. The geometries of the various portions of the conductive runs of the sensor can be used to define the sensor's resonant frequency.

Spiral trace sensor 10 with its inductance operatively coupled to its capacitance defines a magnetic field response sensor. In the presence of a time-varying magnetic field, sensor 10 electrically oscillates at a resonant frequency that is dependent upon the capacitance and inductance of sensor 10. This oscillation occurs as the energy is harmonically transferred between the inductive portion of sensor 10 (as magnetic energy) and the capacitive portion of sensor 10 (as electrical energy). In order to be readily detectable, the capacitance, inductance and resistance of sensor 10 and the energy applied to sensor 10 from the external oscillating magnetic field should be such that the amplitude of the sensor's harmonic response is at least 10 dB greater than any ambient noise where such harmonic response is being measured.

Figure 3:
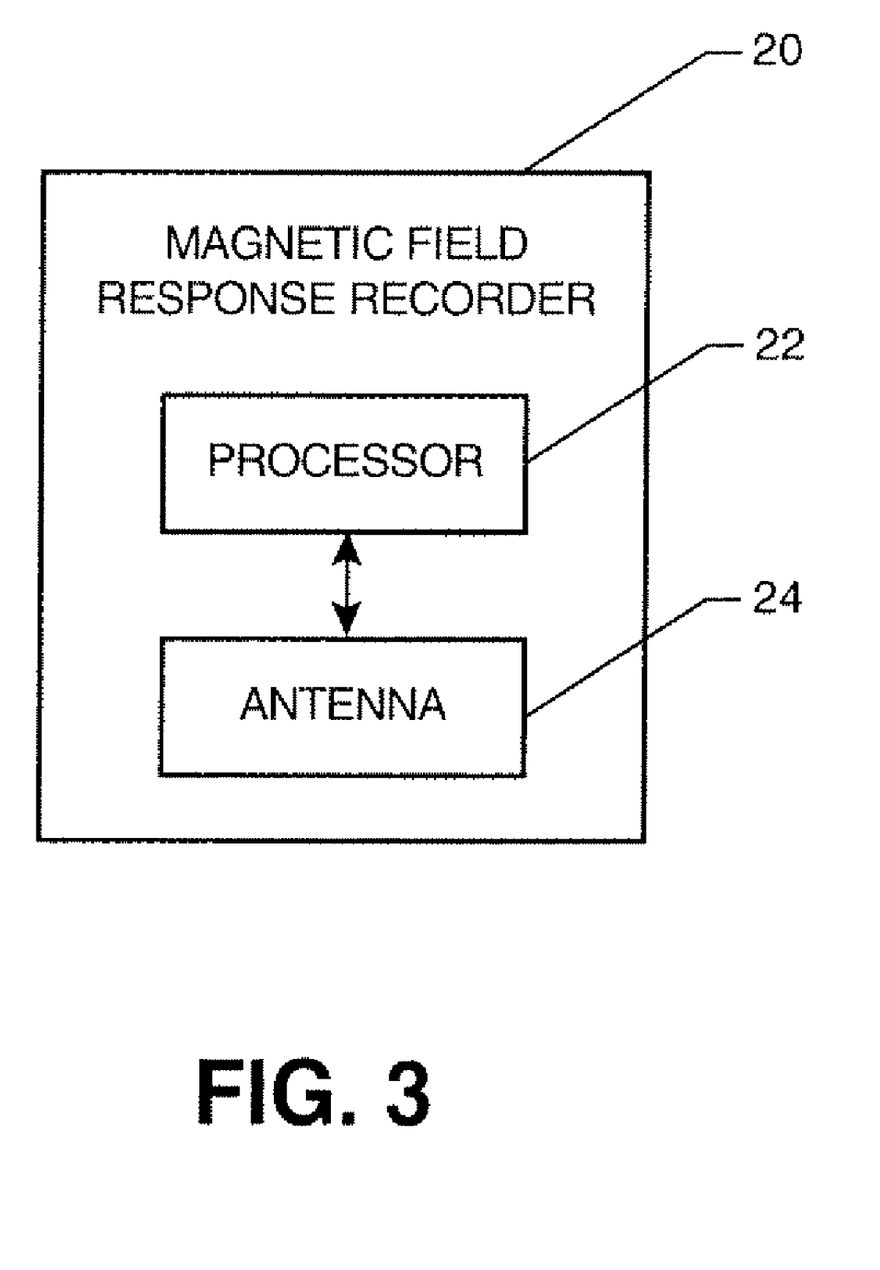
FIG. 3 is a schematic view of an embodiment of a magnetic field response recorder used in the present invention.

The application of the magnetic field to sensor 10 as well as the reading of the induced harmonic response at a resonant frequency is accomplished by magnetic field response recorder 20. The operating principles and construction details of recorder 20 are provided in U.S. Pat. Nos. 7,086,593 and 7,159,774, S. E. Woodard, S. D. Taylor, "Measurement of Multiple unrelated Physical Quantities Using a Single Magnetic Field Response Sensor," Meas. Sci. Technol. 18 (2007) 1603-1613, and S. E. Woodard, B. D. Taylor, Q. A. Shams, R. L. Fox, "Magnetic Field Response Measurement Acquisition System," NASA Technical Memorandum 2005-213518, the contents of each being hereby incorporated by reference m their entirety. Briefly, as shown in FIG. 3, magnetic field response recorder 20 includes a processor 22 and a broadband radio frequency (RF) antenna 24 capable of transmitting and receiving RF energy. Processor 22 includes algorithms embodied in software for controlling antenna 24 and for analyzing the RF signals received from the magnetic field response sensor defined by sensor 10. On the transmission side, processor 22 modulates an input signal that is then supplied to antenna 24 so that antenna 24 produces either a broadband time-varying magnetic field or a single harmonic field. On the reception side, antenna 24 receives harmonic magnetic responses produced by sensor 10. Antenna 24 can be realized by two separate antennas or a single antenna that is switched between transmission and reception. For an operational scenario where tire 100 is mounted on a vehicle, recorder 20 is typically attached to the vehicle in a fixed location 200, such as the vehicle's wheel well. Another option is to fixedly mount just antenna 24 in proximity to the tire while mounting processor 22 at another location in the vehicle.

Figure 4:
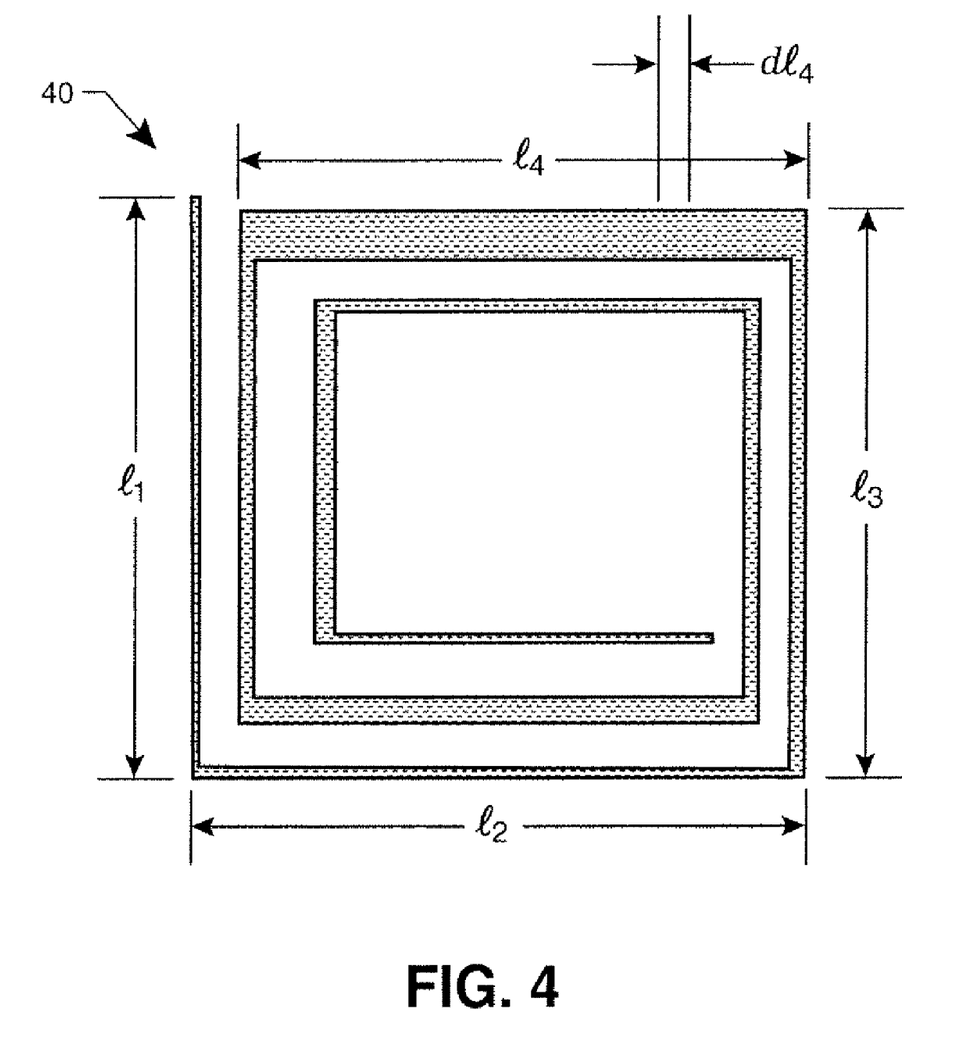
FIG. 4 is a schematic view of a spiral trace sensor whose traces are non-uniform in width.
Figure 5:
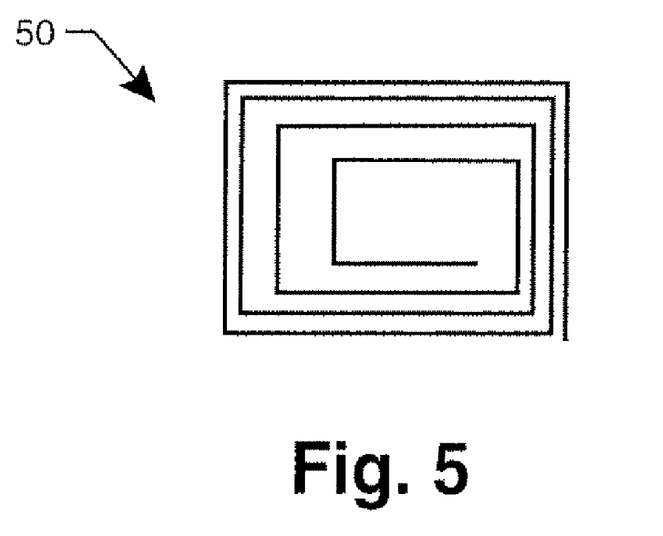
FIG. 5 is a schematic view of a spiral trace sensor having non-uniform spacing between the traces thereof.
Figure 6:
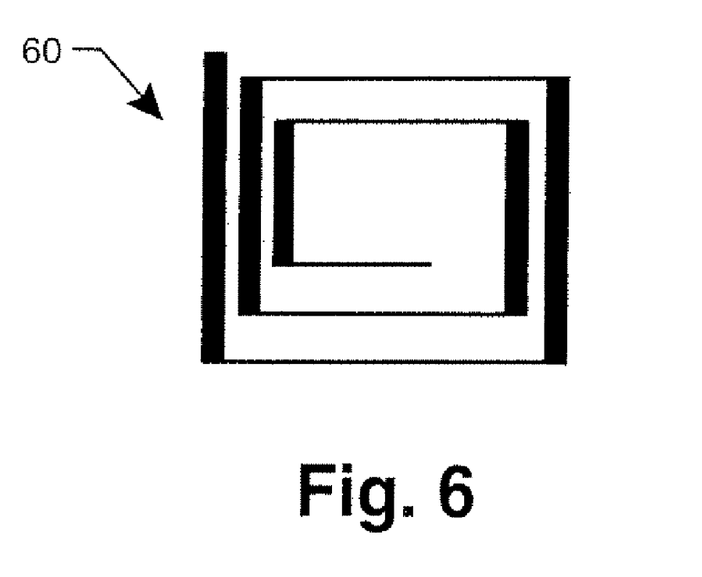
FIG. 6 is a schematic view of a spiral trace sensor having non-uniform trace width and non-uniform trace spacing.

As mentioned above, both the width of the sensor's conductive trace and the spacing between adjacent portions of the conductive trace can be uniform as shown in FIG. 1. However, the present invention is not so limited. For example, FIG. 4 illustrates a sensor 40 in which the width of the conductive trace is non-uniform while the spacing between adjacent portions of the conductive trace is uniform. The lengths of the outer portion of the spiral trace are also annotated. FIG. 5 illustrates a sensor 50 in which the width of the conductive trace is uniform, but the spacing between adjacent portions of the conductive trace is non-uniform. Finally, FIG. 6 illustrates a sensor 60 having both a non-uniform width conductive trace and non-uniform spacing between adjacent portions of the conductive trace.

Figure 7A:
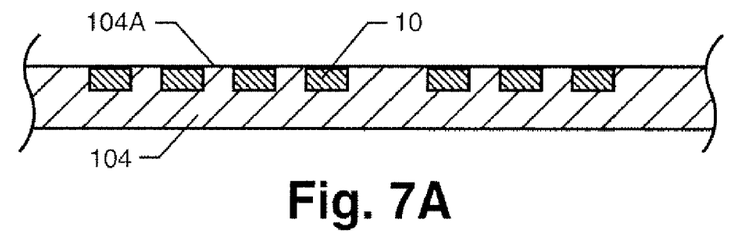
FIG. 7A is a cross-sectional view of a spiral trace sensor with a tire's dielectric material disposed between the sensor's traces with the sensor being flush with the tire's interior surface.
Figure 7B:
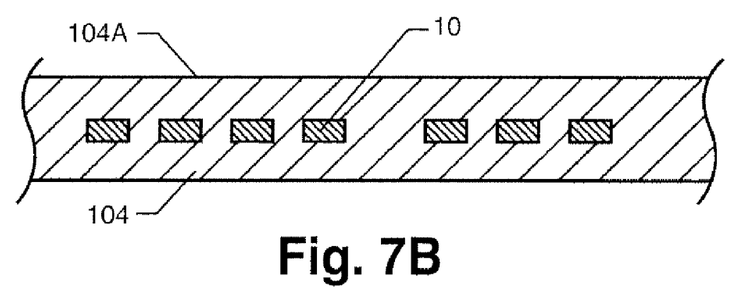
FIG. 7B is a cross-sectional view of a spiral trace sensor embedded within a tire's dielectric material.

As described above, the length/width of the conductive t race and the spacing between adjacent portions of the conductive trace determine the capacitance and inductance (and, therefore, the resonant frequency) of a spiral trace sensor in the present invention. In addition, the sensor's resonant frequency can be modified by providing a dielectric material (i) that resides between adjacent portions of the sensor's conductive trace, or (ii) that encases the sensor's conductive trace. This is illustrated in FIGS. 7A and 7B where a cross-sectional view of a sensor in accordance with the present invention (e.g., sensor 10) has been embedded in tire 100 which comprises a dielectric material. For example, in FIG. 7A, sensor 10 is embedded in tread wall 104 such that it is flush with interior surface 104A so that the dielectric material of tire 100 is under and between the conductive traces of sensor 10. In FIG. 7B, sensor 10 is fully embedded/encased in tread wall 104 so that the dielectric material of tire 100 fully encases and protects sensor 10. Placing sensor 10 on the inner wall of the tire also protects the sensor.

The completely wireless system having only one sensor as described above can be used to collect/record data about a tire. The sensor installed or embedded in the tire is powered and read by a magnetic field response recorder as the tire rotates during vehicle operation. As a result of being powered by a time-varying magnetic field from the recorder, the sensor resonates and the recorder collects/records the frequency, amplitude and bandwidth of the sensor's harmonic response. The present invention uses the attributes of the sensor's harmonic resonance to provide information about the tire. For example, the amplitude of the harmonic response can be used to determine the tire's rotation rate which, in turn, is indicative of vehicle speed and distance traveled. More specifically, since amplitude of the sensor's harmonic response will peak, at its point of closest approach 10 the magnetic field response recorder's antenna, one revolution of tire 100 is indicated each time the peak (or a threshold revel near the peak) is recorded. The time between such peak/threshold level detections can be used in a straight forward fashion to determine tire rotation rate and distance traveled.

The present invention can also be used to determine a number of attributes indicative of the tire's health. If the sensor is embedded within the dielectric material of the tire, tire monitoring in accordance with the present invention can begin daring the manufacture of the tire. That is, if a geometric-patterned sensor in accordance with the present invention is embedded in a tire prior to the curing thereof, the present invention can be used to monitor curing and establish a baseline harmonic response that can be used as a reference measurement for later operational monitoring of the tire. Furthermore, with the sensor embedded in the tire's dielectric material, the sensor is protected from damage, corrosion, etc.

Assuming a sensor of the present invention is embedded in the tire's dielectric material, the present invention can track the curing process by wirelessly powering the sensor and then periodically recording amplitude and frequency of the sensor's harmonic response. Until the tire's dielectric material cures, the embedded sensor's resonant frequency will change with phase changes in the curing dielectric material. Accordingly, the curing process is considered to be active until such time that the sensor's amplitude and frequency stabilize. At this point, the amplitude, frequency and bandwidth of the sensor's harmonic response define a baseline harmonic response that can be used when monitoring the tire during its useful life as will now be described.

A tire that includes a geometric-patterned sensor of the present invention is mounted on a vehicle's wheel (not shown) some time after the tire has cured. A magnetic field response recorder is also mounted on the vehicle in a fixed location that will allow the recorder to power the sensor and collect the harmonic response generated thereby as described above. By way of example, FIGS. 1 and 2 will be referred to again where tire 100 includes sensor 10 and recorder 20 is fixed to a portion 200 of the vehicle (e.g., a wheel well) on which tire 100 is mounted.

As tire 100 rotates, recorder 20 wirelessly transmits a time-varying magnetic field that causes sensor 10 to resonate. Recorder 20 also wirelessly detects the sensor's harmonic response resulting from such resonation. Recorder 20 compares the cured tire's baseline frequency, amplitude and bandwidth to the sensor's current harmonic response attributes. By virtue of these comparisons, a number of physical attributes can be determined using just one sensor. For example, strain changes in the tire are indicated when there is a frequency change (relative to the baseline frequency) without a corresponding change in the bandwidth. Since stress is proportional to tire strain and since tire pressure is proportional to stress in the tire, strain can be used to indicate tire pressure.

Tire damage is indicated when the sensor's frequency is permanently shifted relative to the baseline frequency. That is, the permanent frequency shift indicates that the sensor's conductor is damaged (e.g., via a tire puncture or crack). Tire wear is indicated by gradual changes in frequency and amplitude relative to the tire's baseline frequency and baseline amplitude. If the tire includes steel belts in its construction, the present invention can also be used to monitor the tire for delamination, i.e., tire rubber and steel belt separation. More specifically, tire delamination is indicated when frequency decreases relative to the tire's baseline frequency while amplitude increases relative to the tire's baseline amplitude.

Tire temperature can also be monitored by comparing the bandwidth of the sensor's harmonic response (while the tire is being used) to the tire's baseline bandwidth. This can be explained briefly as follows. The sensor's resistance R is dependent upon temperature T, and can be referenced to a baseline resistance $R_0$ by the following relationship $$R = R_0(1 + \alpha T) \tag{1}$$

where
$\alpha = 0.00427$ and $R_0 = R(0° \text{ C.})$
or more generally $$R_2 = R_1[1 + \alpha_1(T_1 - T_2)] \tag{2}$$

where $$\alpha_1 = \frac{1}{(234.5 + T_1)}. \tag{3}$$

When a sensor is electrically excited via Faraday induction at 0° C., the current in the sensor $I_0$ is $$I_0(0° \text{ C.}) = \frac{\left.\frac{d\Phi_{B_{TX}}}{dt}\right|_{t_0}}{\sqrt{S^2 + R^2(0° \text{ C.})}} \tag{4}$$

where $$S = \left(\omega L - \frac{1}{\omega C}\right). \tag{5}$$

The inductance and resistance are the sum of the inductance and resistance, respectively, of all sensor portions. The capacitance is the sum of the capacitance from the spacing between the traces. Therefore, for n sensor portions, $$L = \sum_{i=1}^{n} L_i \tag{6}$$

$$R = \sum_{i=1}^{n} R_i \tag{7}$$

$$C = \sum_{i=1}^{n-4} C_i. \tag{8}$$

The interrogation antenna (i.e., antenna 24 in recorder 20) transmits a magnetic field of frequency $\omega$, and the sensor has capacitance C and inductance L. The magnetic field response $B_{RX}(0°\text{ C.})$ produced by the geometric pattern at any point in space is $$B_{RX}(0°\text{ C.}) = \left[\frac{\mu}{4\pi}\right]\left[\frac{\frac{d\Phi_{B_{TX}}}{dt}\big|_{t_0}}{\sqrt{S^2 + R^2(0°\text{ C.})}}\right]\sum_{i=1}^{n}\int_{l_i}\frac{dl_i \sin\theta}{r^2} \quad (9)$$

where the magnetic flux, $\Phi_{B_{TX}}$, from the external transmitting antenna acting on the sensor is $$\Phi_{B_{TX}} = \int B_{TX} \cdot dS. \quad (10)$$

$B_{TX}$ is a vector whose direction and magnitude are those of the magnetic field from the transmitting antenna. S is a surface vector whose direction is that of the surface normal and whose magnitude is the area of the sensor surface. In accordance with Faraday's law on induction, the induced electromotive force $\in$ on the sensor is $$\varepsilon = \frac{d\Phi_{B_{TX}}}{dt}. \quad (11)$$

The sensor trace is a series of portions with each portion having a length $l_i$ as shown in FIG. 4. The responding magnetic field $B_{RX}(T)$ of the geometric pattern (sensor) is due to the combined response of each element $dl_i$ along all the sensor portions $l_i$. Each element $dl_i$ is at a distance r from a point on the receiving antenna. The sensor response $B_{RX}(T)$ at any temperature T in degrees Celsius, in terms of the sensor electrical resistance at 0° C., is $$B_{RX}(T) = \left[\frac{\mu}{4\pi}\right]\left[\frac{\frac{d\Phi_{B_{TX}}}{dt}\big|_{t_0}}{\sqrt{S^2 + (1 + 0.00427T)^2 R^2(0°\text{ C.})}}\right]\sum_{i=1}^{n}\int_{l_i}\frac{dl_i \sin\theta}{r^2}. \quad (12)$$

$B_{RX}(T)$ is dependent on temperature for fixed values of T, L and C and a reference response $B_{RX}(0°\text{ C.})$. Note that any temperature could be used to establish a reference. Using this relationship, one can readily see that the bandwidth increases monotonically with temperature. The total sensor response received by the receiving antenna would be the summation of the response for each point on the antenna.

The advantages of the present invention are numerous. A single, geometric-patterned, open-circuit sensor mounted in a tire can provide a variety of tire data when wirelessly powered and read by a magnetic field response recorder. When the sensor is embedded in the tire during its manufacture, the present invention can also be used to monitor the tire's curing process. The sensor can be made from a lightweight conductive trace and will, therefore, not affect a tire's rotational balance. The present invention can be readily extended to work with any non-conducting rotating system such as pulleys, propellers, etc.

Figure 8:
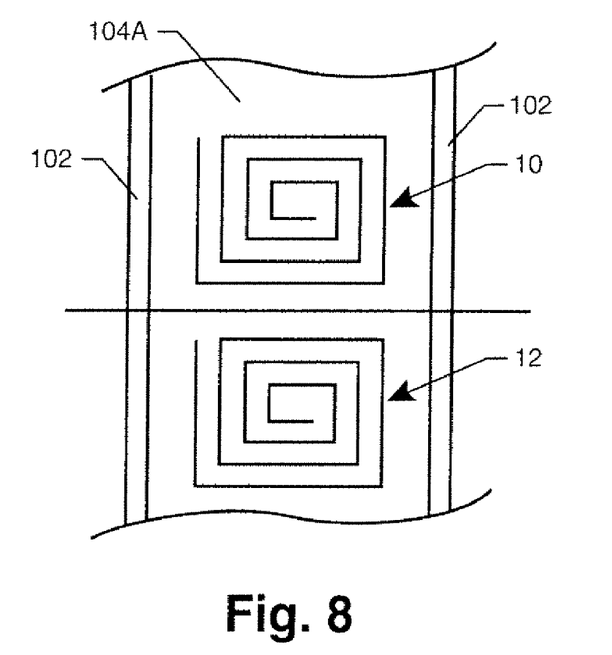
FIG. 8 is a plan view of a portion of a tire's interior having two sensors mounted therein in accordance with another embodiment of the present invention.
Figure 9:
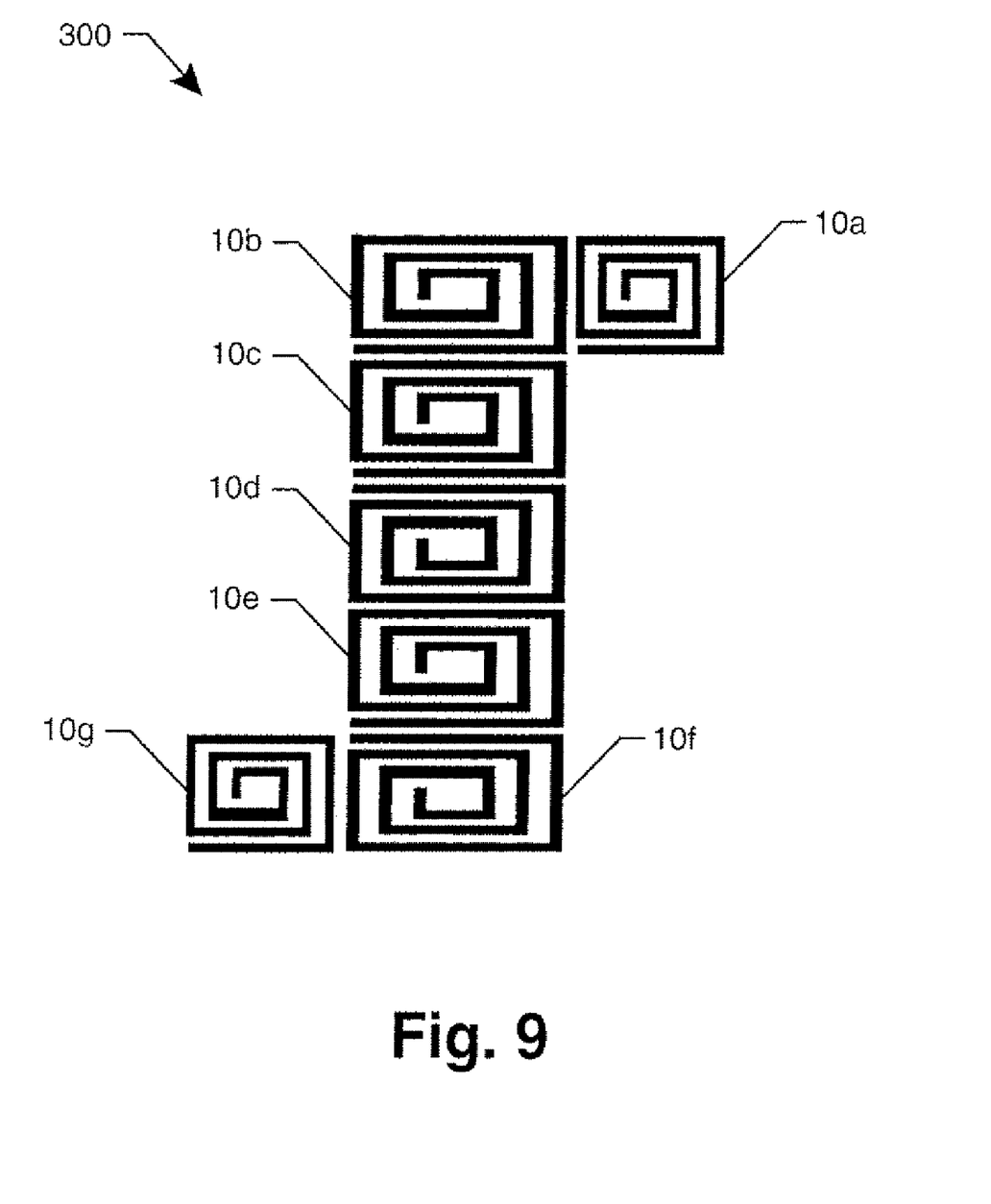
FIG. 9 is a schematic of another embodiment of the present invention having an inductively coupled tire sensor array.
Figure 10:
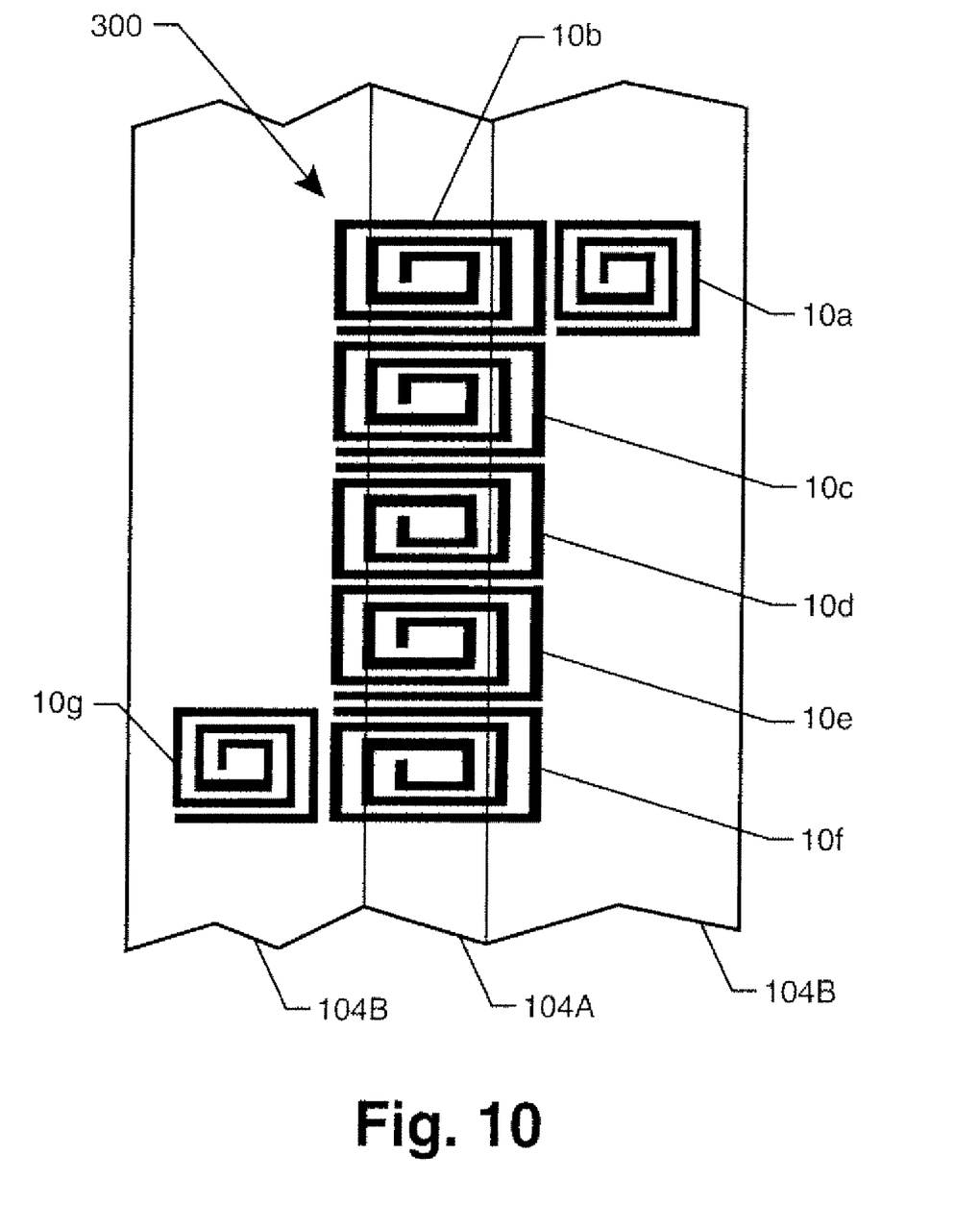
FIG. 10 is a view of the tire sensor array of FIG. 9 positioned inside the tire and affixed to the inner sidewall and inner wall bottom surface.
Figure 11:
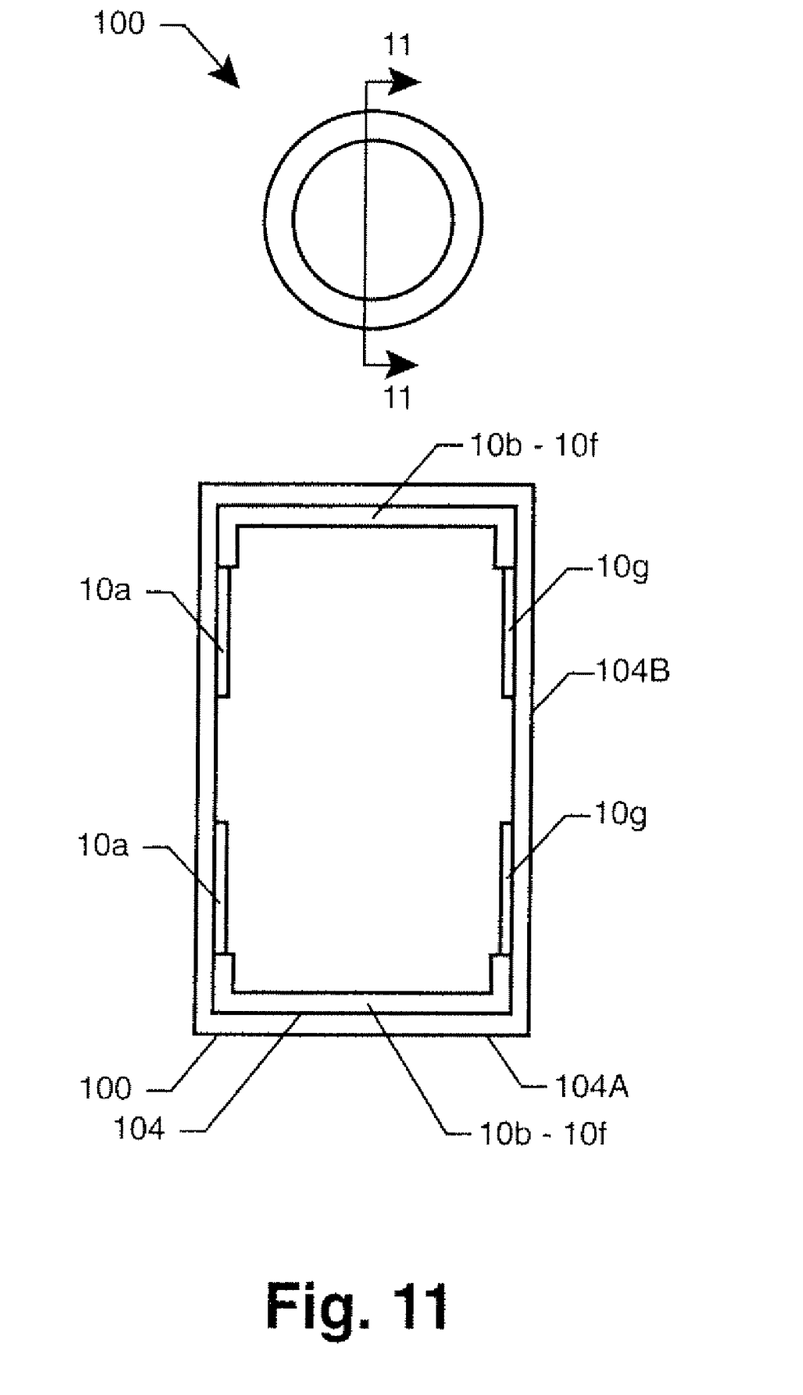
FIG. 11 is a cross-sectional view of the sensor array of FIG. 9 inside the tire.

Although the invention has been described relative to a specific embodiment thereof, there are numerous variations and modifications that will be readily apparent to those skilled in the art in light of the above teachings. For example, as shown in FIG. 8, a second sensor 12 having a unique resonant frequency can be positioned in tire 100. Sensor 12 is spaced apart from the first sensor 10 in the direction of tire rotation. Using two sensors having unique resonant frequencies, the present invention can also be used to indicate a rotational direction of the tire. That is, if the resonant frequency of sensor 10 is $f_{10}$ and the resonant frequency of sensor 12 is $f_{12}$ where $f_{10} \neq f_{12}$, the tire's direction, of rotation is indicated by the order in which the amplitudes of the two sensors' harmonic responses increase. FIG. 9 illustrates a further embodiment of the present invention having an array 300 of spiral trace sensors (10a-10g). Other geometric patterns could also be used in the array. Sensor array 300 has all but two sensors (10a and 10g) aligned. Although five aligned sensors (10b-10f) are shown, the present invention is not limited to a particular number. Any number of aligned sensors can be used. The two sensors 10a and 10g are placed adjacent to the aligned sensors so that they are inductively coupled to the aligned sensors, but not positioned along the same line. Although the non-aligned sensors are shown on opposite sides of the aligned sensors, they could be positioned along either side. The response recorder 20 with external antenna 24 is positioned to power and receive the responses from sensors 10a and 10g. Because sensors 10b-10f are inductively coupled to sensors 10a and 10g, their responses will be superimposed upon both sensor 10a and sensor 10g. For an operational scenario where tire 100 is mounted on a vehicle, recorder 20 with external antenna 24 is typically attached to the vehicle in a fixed location 200, such as the vehicle's wheel well. Alternatively, antenna 24 can be mounted in proximity to the tire while processor 22 is mounted at another location in the vehicle. FIG. 10 illustrates sensor array 300 placed inside the tire. The array 300 is positioned so that sensors 10a and 10g are completely placed on the inner tire sidewall 104b, therefore allowing their responses to not be attenuated by the tire's steel belts. Sensors 10b-10f are positioned on the inner wall bottom surface 104a, with a portion of each sensor placed upon the tire inner sidewall. FIG. 11 illustrates a cross-sectional view of sensor array 300 placed inside the tire 100. If any sensor in the array 300 should have its response change (as result of the change in a physical quantity that it is measuring), the change will manifest Itself in the responses of sensors 10a and 10g.

The array 300 is applicable to either steel belted or non-steel belted tires. Sensor 10a and 10g have response frequencies $\omega_a$ and $\omega_g$ which are unique and separated in value from those of sensors 10b-10f. Sensors 10a and 10g can be used to determine wheel speed and direction. All sensors (10a-10g) can be used to measure rubber curing, tire pressure, rubber delamination, tire wear, tire damage and inner tire temperature. Sensor array 300 is placed along the inner wall of the tire in a manner that allows sensors 10b-10f to extend beyond the tire's inner bottom wall onto the tires inner side wall. All sensors 10a-10g are inductively coupled so that any damage such as puncture, tear or wear to either sensor will be discernable by measuring change in response to any sensor. The sensors generally to be measured are 10a and 10g. Each sensor (10a-10g) can have a unique frequency range that does not overlap with the other sensors. In an even further embodiment, sensor 10a and 10g have unique frequency ranges, and sensors 10b-10f have the same frequency. Multiple arrays 300 can be placed along the inner wall of the tire so that the entire inner wall is completely covered with the sensors. Sensors 10a and 10g can be interrogated using a recorder 20 whose antenna 24 is placed in the wheel well of a vehicle.

It is therefore to re understood that, within the scope of the appended claims, the invention may be practiced other than as specifically described.

What is claimed as new and desired to be secured by Letters Patent of the United States is:

1. A wireless system for collecting data indicative of a rotating system's characteristics, comprising:
   at least one electrical conductor having first and second ends and shaped to form a geometric pattern between said first and second ends, said conductor so-shaped defining an open-circuit that can store electrical and magnetic energy wherein, in the presence of a time-varying magnetic field, said conductor so-shaped resonates to generate a harmonic response having a frequency, amplitude and bandwidth, said conductor so-shaped positioned within a rotating system; and
   a magnetic field response recorder for wirelessly transmitting said time-varying magnetic field to said conductor so-shaped and for wirelessly detecting said harmonic magnetic field response and said frequency, amplitude and bandwidth associated therewith, said recorder positioned in a location that is fixed with respect to said rotating system as said rotating system rotates.

2. A wireless system as in claim 1 wherein said conductor comprises a thin-film trace defining said geometric pattern.

3. A wireless system as in claim 1 wherein said conductor is coupled to an inside surface of the rotating system.

4. A wireless system as in claim 1 wherein said conductor is embedded within the rotating system.

5. A wireless system as in claim 2 wherein the width of said trace is selected from the group consisting of uniform and non-uniform.

6. A wireless system as in claim 2 wherein spacing between adjacent portions of said trace is selected from the group consisting of uniform and non-uniform.

7. A wireless system as in claim 1 wherein said recorder comprises a processor for determining the magnitude of said frequency, amplitude and bandwidth.

8. A wireless system as in claim 7 wherein said recorder comprises antenna means for wirelessly transmitting said time-varying magnetic field to said conductor so-shaped and for wirelessly detecting said harmonic magnetic field response frequency, amplitude and bandwidth associated therewith.

9. A wireless system as in claim 8 wherein the position of said antenna means is selected from the group consisting of co-location with said processor and separate location from said processor.

10. A wireless system as in claim 1 wherein said at least one electrical conductor comprises a first conductor and a second conductor, said first conductor resonating at a first frequency in response to said time-varying magnetic field and said second conductor resonating at a second frequency in response to said time-varying magnetic field wherein said second frequency is different than said first frequency, said first conductor and said second conductor being spaced apart from one another within said rotating system such that said recorder detects said first frequency and said second frequency with rate amplitude changes for said first frequency and rate amplitude changes for said second frequency, said rate amplitude changes being indicative of rotation rate and rotation direction of said rotating system.

11. A wireless system as in claim 1 wherein said at least one conductor comprises a first conductor set and a second conductor set, said first set comprising a plurality of conductors aligned along a common axis and said second set comprising at least one first conductor and at least one second conductor, both positioned adjacent to said first set and inductively coupled thereto, such that said recorder detects responses from said first and second conductors, whereby response changes in said first set are detected in said first and second conductor responses.

12. A wireless system as in claim 11 wherein said rotating system is a tire and further wherein said second set of conductors is coupled to said tire inner sidewall, and said first set of conductors is coupled to both said tire inner bottom wall and said tire inner sidewall, wherein said plurality of conductors extend around at least a portion of said tire's circumference.

13. A wireless system as in claim 11 wherein each conductor in said first set and second set resonate at a different frequency in response to said time-varying magnetic field.

14. A wireless system as in claim 11 wherein each conductor in said first set resonates at the same frequency in response to said time-varying magnetic field, and said conductors in said second set resonate at frequencies different from one another and different from said first set conductors.

15. A wireless system for collecting data indicative of a tire's characteristics, comprising:
   an electrical conductor having first and second ends and shaped to form a geometric pattern between said first and second ends, said conductor so-shaped defining an open-circuit that can store electrical and magnetic energy wherein, in the presence of a time-varying magnetic field, said conductor so-shaped resonates to generate a harmonic response having a frequency, amplitude and bandwidth, said conductor so-shaped positioned within a tire prior to the curing thereof; and
   a magnetic field response recorder for wirelessly transmitting said time-varying magnetic field to said conductor so-shaped and for wirelessly detecting said harmonic response and said frequency, amplitude and bandwidth associated therewith firstly as the tire cures and subsequently as the tire rotates when mounted on a vehicle.

16. A wireless system as in claim 15 wherein said harmonic response and said frequency, amplitude and bandwidth are used to simultaneously determine one or more tire attributes selected from the group consisting of damage, temperature, wear, delamination, strain, dielectric changes and pressure when said tire is mounted and simultaneously determine one or more tire attributes selected from the group consisting of rotation speed, temperature, damage and delamination when said tire rotates.

17. A wireless system as in claim 15 wherein said conductor comprises a thin-film trace defining said geometric pattern, further wherein the width of said trace is selected from the group consisting of uniform and non-uniform.

18. A wireless system as in claim 15 wherein said conductor comprises a thin-film trace defining said geometric pattern, further wherein the spacing between adjacent portions of said trace is selected from the group consisting of uniform and non-uniform.

19. A wireless system as in claim 15 wherein said recorder comprises a processor for determining the magnitude of said frequency, amplitude and bandwidth.

20. A wireless method of collecting data indicative of a tire's characteristics, comprising the steps of:
   providing at least one electrical conductor having first and second ends and shaped to form a geometric pattern between said first and second ends, said conductor so-shaped defining an open-circuit that can store electrical and magnetic energy wherein, in the presence of a time-varying magnetic field, said conductor so-shaped resonates to generate a harmonic response having a frequency, amplitude and bandwidth;

embedding said conductor so-shaped within a tire prior to the curing thereof;

wirelessly transmitting said time-varying magnetic field to said conductor so-shaped from a location that is remote with respect to the tire; and wirelessly detecting said harmonic response and said frequency, amplitude and bandwidth associated therewith at said location.

21. A method according to claim 20 wherein, when the tire has cured and has been mounted on a vehicle, said location for said steps of wirelessly transmitting and wirelessly detecting is defined by a fixed position on the vehicle.

22. A method according to claim 20 wherein, when the tire has cured and has been mounted on a vehicle, said method further comprises the step of comparing said bandwidth so-detected at different points in time to monitor temperature of the tire.

23. A method according to claim 20 wherein, when the tire has cured and has been mounted on a vehicle, said method further comprises the step of comparing said amplitude so-detected to a threshold to monitor rotation rate of the tire.

24. A method according to claim 20 wherein, after the tire has cured, said method further comprises the step of recording said frequency and amplitude so-detected to establish a baseline frequency and a baseline amplitude for the tire.

25. A method according to claim 24 wherein, to monitor tire health after the tire has been mounted on a vehicle for rotation, said method further comprises the steps of:

comparing said baseline frequency with said frequency so-detected as the tire rotates;

comparing said baseline amplitude with said amplitude so-detected as the tire rotates; and comparing said baseline bandwidth with said bandwidth so-detected as the tire rotates.

* * * * *